(12) United States Patent
Alibakhsh et al.

(10) Patent No.: US 8,103,906 B1
(45) Date of Patent: Jan. 24, 2012

(54) SYSTEM AND METHOD FOR PROVIDING TOTAL REAL-TIME REDUNDANCY FOR A PLURALITY OF CLIENT-SERVER SYSTEMS

(76) Inventors: Massoud Alibakhsh, Atlanta, GA (US); Shahram Famorzadeh, Marietta, GA (US)

( * ) Notice: Subject to any disclaimer, the term of this patent is extended or adjusted under 35 U.S.C. 154(b) by 0 days.

(21) Appl. No.: 12/895,983

(22) Filed: Oct. 1, 2010

(51) Int. Cl.
G06F 11/00 (2006.01)
G06F 11/07 (2006.01)

(52) U.S. Cl. ............. 714/13; 714/4.11; 714/4.12; 718/1

(58) Field of Classification Search ............... 714/4.12, 714/4.11, 10, 13; 718/1
See application file for complete search history.

(56) References Cited

U.S. PATENT DOCUMENTS

| | | | |
|---|---|---|---|
| 4,674,038 | A | 6/1987 | Brelsford et al. |
| 5,805,790 | A | 9/1998 | Nota et al. |
| 5,822,512 | A * | 10/1998 | Goodrum et al. ............... 714/13 |
| 5,852,724 | A | 12/1998 | Glenn, II et al. |
| 6,108,300 | A | 8/2000 | Coile et al. |
| 6,587,970 | B1 | 7/2003 | Wang et al. |
| 7,409,577 | B2 | 8/2008 | Wing et al. |
| 7,484,208 | B1 * | 1/2009 | Nelson ............... 718/1 |
| 7,487,383 | B2 | 2/2009 | Bensinger |
| 7,509,540 | B1 | 3/2009 | Lovy et al. |
| 7,788,521 | B1 * | 8/2010 | Sim-Tang ............... 714/4.12 |
| 7,814,364 | B2 * | 10/2010 | Sankaran et al. ............ 714/4.12 |
| 7,971,094 | B1 * | 6/2011 | Benn et al. ............... 714/13 |
| 2004/0158766 | A1 | 8/2004 | Liccione et al. |
| 2004/0168201 | A1 * | 8/2004 | Tada et al. ............... 725/132 |
| 2004/0172574 | A1 * | 9/2004 | Wing et al. ............... 714/4 |
| 2005/0193245 | A1 | 9/2005 | Hayden et al. |
| 2005/0198303 | A1 * | 9/2005 | Knauerhase et al. ........ 709/227 |
| 2007/0089111 | A1 * | 4/2007 | Robinson et al. ............ 718/1 |
| 2007/0100913 | A1 | 5/2007 | Sumner et al. |
| 2007/0250833 | A1 * | 10/2007 | Araujo et al. ............... 718/1 |
| 2009/0055822 | A1 * | 2/2009 | Tolman et al. ............... 718/1 |
| 2009/0172799 | A1 * | 7/2009 | Morgan ............... 726/11 |
| 2009/0249284 | A1 * | 10/2009 | Antosz et al. ............... 717/104 |
| 2009/0288084 | A1 * | 11/2009 | Astete et al. ............... 718/1 |
| 2009/0300423 | A1 * | 12/2009 | Ferris ............... 714/38 |
| 2010/0050172 | A1 | 2/2010 | Ferris |
| 2010/0070870 | A1 * | 3/2010 | Halperin et al. ............. 715/742 |
| 2011/0269111 | A1 * | 11/2011 | Elesseily et al. ............. 434/362 |

FOREIGN PATENT DOCUMENTS

| | | |
|---|---|---|
| WO | 9503580 | 2/1995 |
| WO | 2004079499 | 9/2004 |

* cited by examiner

*Primary Examiner* — Joseph Schell
(74) *Attorney, Agent, or Firm* — Williamson Intellectual Property Law, LLC; Thomas R. Williamson, III (57) ABSTRACT

An automated and scalable system for total real-time redundancy of a plurality of client-server systems, wherein, data is replicated through a network connection and operationally located on a virtual machine that substitutes for a failed client-server system, wherein the virtual machine is activated and installed on the cloud computing environment. Monitoring applications are installed on both the client-server systems and the cloud computing environment. System components are identified, a network connection is initiated, a heartbeat is established, data replication is automated, system failure is detected, failover is initiated, and subsequent client-server restoration is automated.

4 Claims, 9 Drawing Sheets

SYSTEM AND METHOD FOR PROVIDING TOTAL REAL-TIME REDUNDANCY FOR A PLURALITY OF CLIENT-SERVER SYSTEMS

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to disaster recovery and non-stop services for computers, and more specifically to an automated and scalable system and method that provides total real-time redundancy for a plurality of client-servers utilizing virtual machines installed in a cloud computing environment that substitute for a failed client-server.

2. Description of Related Art

Generally speaking, in a client-server modeled system, a client (e.g., a computer terminal or server) requests resources from a server, which then provides a service by sharing its resources with the client. Many businesses, like those in the healthcare industry, rely on client-server systems to store critical data and applications, perform tasks, and operate their business. However, this reliance also leaves businesses vulnerable to disruptions caused by server failure, computer viruses, natural disasters, acts of terrorism, or any other event preventing the server from processing client requests. Since even temporary downtime can have significant financial impact, businesses must be disaster ready or run the risk of operations grinding to a complete halt when disaster occurs. Ideally, effective disaster recovery should be automated, scalable and address all data backup, failover (automatic switching to a backup operational system) and system restoration needs.

Prior art patents and other publications offer several attempts to meet these challenges. For example, businesses can backup applications and data using machine readable storage media including, but not limited to, magnetic tapes, Storage Area Networks (SAN), Network Attached Storage (NAS), flash storage, disks or any combination thereof. Moreover, an increasing number of vendors now offer data replication and storage services, requiring businesses to purchase and use additional computer hardware or software to replicate data through a network connection to offsite datacenters or cloud computing environments. In some cases, vendors also provide an add-on option to failover and connect to virtual machines which are installed on available datacenter or cloud resources, once system failure is detected. These virtual machines substitute onsite networked computers or servers for failed systems and are installed with the appropriate operating systems, applications and data so that businesses can continue normal operations. Once failed systems are replaced or repaired, businesses can then easily restore and load their data by retrieving a backup copy from their vendor or utilizing a copy stored locally.

Several prior systems rely on providing a backup file server to allow data to be recovered therefrom when a main system fails. Often such data is created as an image so that such can be reinstalled once the primary system fails. Other such prior systems allow for running a virtual machine over a network, but do not provide recovery of a failed system. Yet another system allows creation of data on virtual machines to allocate resources therebetween. Still another provides for configuration of virtual machines according to custom specifications desired by the user. Other systems provide data backup to a cloud computing environment of virtual machines.

Another prior system provides for monitoring of a computer system by virtual machines having some data thereon in order to send alerts to the computer system user of any device failure. Similar systems monitor and alert of any failure, so that a new system can be substituted. Yet another prior system creates a virtual machine for substitution one-on-one for a specific computer system. Still another system provides for detection of failure in a first computer and subsequent configuration of a second computer to relieve or enhance the first. Still another system substitutes a virtual machine during re-initialization of a main computer to preserve work in progress.

The above-mentioned solutions, as well as others, are generalized in scope and are not always cost effective, scalable or convenient for those utilizing client-server systems. For example, many medical practices prematurely purchased expensive client-server based Electronic Health Record (EHR) systems after the federal government passed the American Recovery and Reinvestment Act (ARRA) of 2009 which included incentive payments for those incorporating healthcare technology and fines for those avoiding it. Since most small- and medium-sized practices cannot afford information technology (IT) staff, and lack employees with technical expertise, they were ill-equipped to make informed purchases and now face the frightening reality that they are not disaster ready. A simple backup strategy does help protect their data; however, without continuous access to their specialized EHR application, this data is useless. Therefore, practices must not only backup their data and systems, they must also be able to failover when needed with minimal downtime and inconvenience. Now practices are backed into a corner and must buy additional hardware and/or software over the costs of their initial investment, and, in many cases, must pay high costs for IT support to compensate for their lack of automation.

Therefore, it is readily apparent that there is a need for an automated and scalable system and method, providing total real-time redundancy to a plurality of client-server systems, to protect such businesses to allow them to continue normal operations during a disaster.

BRIEF SUMMARY OF THE INVENTION

Briefly described, in a preferred embodiment, the present invention overcomes the above-mentioned disadvantages and meets the recognized need for such a device by providing an automated and scalable system for total real-time redundancy of a plurality of client-server systems, wherein the system comprises a plurality of client-server systems, data replicated through a network connection and stored in a cloud computing environment on at least one machine readable storage medium. The preferred embodiment further includes an application installed on both the client-server systems and the cloud computing environment, wherein system components are identified, a network connection is initiated, a heartbeat is established (i.e., sensing if a system is ready for use), data replication is automated, system failure is detected, failover is initiated, and subsequent client-server restoration is automated. The preferred embodiment further comprises a plurality of virtual machines, activated and installed on the cloud computing environment, to substitute for a failed client-server system and a private network connection for users to access and utilize the virtual machines.

The present invention also provides an automated and scalable method for providing total real-time redundancy for a plurality of client-server systems, the method comprising installing an application on client-server systems and a cloud computing environment; storing a plurality of replicated client-server systems as virtual machines in a cloud computing environment on at least one machine readable storage medium; activating the virtual machines on the cloud computing environment to substitute for a failed client-server system in the event a system failure is detected; and subsequently restoring the client-server system after system recovery.

Whereas other previous solutions are general in scope and often require active participation, an advantage of the preferred embodiment is that the application installed on both the client-server system and cloud computing environment is specifically configured for both relational (e.g., MySQL or SQL) and non-relational (e.g., MongoDB or Hypertable) servers, thus providing a complete solution for client-server backup, failover, and restoration, while allowing greater automation of those processes with minimal user interaction.

Preferably, a client-server system comprises at least one networked computer or terminal, a software application, and one type of database server containing application-relevant data stored on at least one machine readable storage medium. A replicator application (Replication Monitor Agent) installed on at least one of a plurality of the client-server systems identifies system components, initiates a network connection, establishes a heartbeat, and replicates at least the software application, application relevant data and client-server component information through a network connection and stores same in a cloud computing environment. However, if the software application was previously stored on the cloud computing environment, it does not need to be replicated again, unless a change in installation is detected.

The Replication Monitor Agent is available for download via website, after users open an account. During installation, a setup wizard helps validate system component and other relevant information. Later, the website is also utilized during failover as a login portal page for users to access and utilize the virtual machines installed on the cloud computing environment. Once downloaded, the Replication Monitor Agent on the client-server initiates a secure network connection to the cloud using a Virtual Private Network or similarly secured connection; this is automated and does not require any sort of user authentication process. However, to later access the virtual machines during failover using the VPN, users will have to first login and be authenticated. It will be recognized by those skilled in the art that data encryption is an added benefit of replicating data over a secured network connection.

Preferably, the cloud computing environment is a scalable distributed service accessible via public network (Internet) providing computing and storage resources, which are only utilized as needed for backup, failover, and restoration processes. A Master Monitor application pre-installed on the cloud computing environment stores the software application and client-server component information dormant in binary form utilizing at least one machine readable storage medium, while the application relevant data is updated in real-time utilizing available memory. Furthermore, common operating systems and relevant applications (e.g., ADOBE READER) are pre-stored dormant in binary form on the cloud computing environment utilizing available storage resources.

As data changes on the database server, the Replication Monitor Agent replicates the changes via the network connection to the Master Monitor, which then updates the data on the cloud computing environment. In addition, the Master Monitor also monitors database server's heartbeat to detect system failure and initiate failover when needed.

When system failure occurs, the Master Monitor activates and installs the virtual machines residing on the cloud computing environment to substitute for a failed client-server system. These virtual machines are built according to client-server system components previously identified, which include at least the operating system, a software application, a number of networked computers and/or terminals, the capacity (processing and/or memory) and configuration of those networked computers, a database, a database connection, and relevant application components. The virtual machines are then installed with the operating system (OS), the software application and data corresponding to the failed system. Users must utilize the website to log in, access and use the virtual machines via a private network connection, such as, for exemplary purposes only, a terminal server or a virtual private network (VPN).

Once a failed system is repaired or replaced and the network connection and heartbeat to the cloud computing environment is restored, the Master Monitor deactivates the virtual machines, replicates the software application, if necessary, and replicates application relevant data back through the network connection to restore the client-server system.

According to its major aspects and broadly stated, the present invention in its preferred form is an automated and scalable system for providing total real-time redundancy for a plurality of client-servers, such as, without limitation and for exemplary purposes only, a networked computer, available and unavailable memory, a software application, and a database server containing application-relevant data stored on the machine readable storage medium, wherein the client-servers replicate their data via a secure public network connection, and the replicated data is stored in a cloud computing environment on at least one machine readable storage medium. The client-server components comprise at least an operating system, a software application, a plurality of networked computers, processing and memory capacity, the configuration of the networked computers, a database, a database connection, and relevant application components. The cloud computing environment, which provides computing and storage resources, comprises a scalable distributed service accessible via a public network, such as, for exemplary purposes only, the Internet.

The replicated data comprises at least a software application, application-relevant data, and information related to the client-server components. The operating system, the software application, the common relevant applications and the information related to the client-server components are pre-stored dormant in binary form on the cloud computing environment utilizing the machine readable storage medium or other available storage resources. The software application is not replicated if it is already stored dormant in binary form on the cloud computing environment. The application-relevant data is replicated and updated in real-time on the cloud computing environment utilizing the available memory. The computing resources are conditionally fully activated and utilized upon detection of failure of a client-server.

A Replication Monitor Agent is downloaded and installed on both the client-servers and the cloud computing environment, wherein the Replication Monitor Agent identifies components of the client-server, initiates the secure public network connection, establishes a heartbeat, automates data replication, detects failure of a client-server, initiates failover, and automates restoration of the failed client-server.

A plurality of virtual machines are activated and installed on the cloud computing environment, and the virtual machines substitute for the failed client-server. The virtual machines are constructed according to the identified client-server components, and have installed thereon the operating system, the software application and the replicated data corresponding to the application relevant data operating in the failed client-server. Users access and utilize the virtual machines via the private network connection.

In use, the automated and scalable method for providing total real-time redundancy for a plurality of client-servers begins by downloading and installing a Replication Monitor Agent on client-servers and on a cloud computing environment. Subsequently, data existing on said client-servers is replicated and stored in the cloud computing environment on a machine readable storage medium. Virtual machines are created and activated on the cloud computing environment, wherein virtual machines substitute for a failed client-server in the event of such failure. Operating systems and other common relevant applications are pre-stored dormant in a binary form on the cloud computing environment utilizing the available storage resources.

In the event of a failure, users are allowed to login, access and use the virtual machines via a private network connection to initiate restoration of the client-servers from the stored replicated data. Under certain circumstances, users activate and access the virtual machines in a read-only mode.

The Replication Monitoring Agent identifies the client-server components, initiates a secure public network connection to the cloud computing environment, establishes a heartbeat, replicates client-server data through the network connection to the cloud computing environment, communicates client-server component and data changes to the cloud computing environment, initiates failover when a database server failure is detected, by notifying a Master Monitor installed on the cloud computing environment, and restores the client-server after failure by identifying client-server components, initiating a secure public network connection to the cloud computing environment, establishing a heartbeat, and managing distribution, organization, installation and storage of the replicated data on the client-server.

The Master Monitor, which is installed on the cloud computing environment, manages distribution, organization and storage of the replicated data on the cloud computing environment utilizing available storage resources, monitors communications from the client-server, updates data as such changes, monitors client-server heartbeats, diagnoses causes of heartbeat interruptions, initiates failover when either a database server is down or a client-server failure is detected, wherein the failover is initiated by sending a message to a designated user requesting permission to activate and install the virtual machines. The Master Monitor further obtains client-server component information, partitions needed computing resources on the cloud computing environment; activates the virtual machines, and installs an operating system corresponding to the client-server's operating system, a software application and relevant data on the virtual machines. Additionally, the Master Monitor monitors and manages cloud resource usage and load balancing, allows users to login, access and utilize the virtual machines via the private network connection, and restores the client-server after failure by disassembling the virtual machines, and replicating data through the private network connection to the client-server.

More specifically, the present invention is a system for providing total real-time redundancy for a plurality of client-servers, the system comprising client-servers and a cloud computing environment. When one of the client-servers fails, the cloud computing environment substitutes for the failed client-server by providing a virtual machine or machines constructed from replicated client-server data stored on a machine readable storage medium.

The system further comprises a secure network connection, such as a local direct network connection or a secure Internet connection between the client-servers and the cloud computing environment to provide electronic communication with replicated client-server data and the virtual machine substituting for the failed client-server.

The client-servers comprise computers (or alternatively, smart terminals in electronic communication via a local network connection with the database server), a local network connection, a software application, a database server, stored application relevant data and a Replication Monitor Agent. The local network connection provides electronic communication between the computers and the database server which has the software application and stored application relevant data residing thereon. The stored application relevant data can be stored on any machine readable storage medium permitting the stored application relevant data to be in communication with the database server. The software application could alternatively operate on the computers in lieu of the database server.

The cloud computing environment has a Master Monitor installed thereon. Additionally, it comprises cloud storage resources, such as a machine readable storage medium, and cloud available memory that has replicated application data thereon. The cloud storage resources comprise the replicated software application (in binary form), identified client-server component information (in binary form), pre-stored operating systems (in binary form), and pre-stored common relevant applications (in binary form).

The Master Monitor communicates with the Replication Monitor Agent via the secure network connection. A heartbeat is established between the client-server and the cloud computing environment via the secure network connection, wherein the heartbeat comprises any signal that is identifiable to indicate that the client-server is functional.

During the initial setup process, the Replication Monitor Agent is downloaded and installed on the client-server, a designated user is identified and contact information is entered for the designated user. Subsequently, login credentials such as a username and password combination are created for the user. The Replication Monitor Agent has a setup and installation wizard that is executed after downloading. Identified client-server component information is obtained, the operating system is identified and the software application is identified. Subsequently, the networked computers are identified, and capacity, such as processing capacity and memory capacity, is identified, and the configuration of the computers is also identified. The database and database connections are next identified, along with relevant application components.

Installation and operation of the Replication Monitor Agent on the client-server allocates buffering computational resources, establish communications with the cloud computing environment, and establishes the heartbeat with the Master Monitor. Activation of the virtual machines is detected. If virtual machines are not active, data is replicated to the cloud computing environment. Subsequently, a decision is made whether the software application is present on the cloud computing environment and, if so, replication of the software application does not take place and the process continues with replication of the client-server component information. If the software application is not present on the cloud computing environment, the software application is replicated to the cloud computing environment and the process continues.

Subsequently, the application relevant data is replicated to the cloud computing environment. Next, a decision is made whether the database server is down, and, if affirmative, the Master Monitor is notified. If the database is not down, a determination is made whether client-server data has been updated. If so, application relevant data is again replicated to the cloud computing environment. If not, then data is not replicated.

The Master Monitor stores and updates data as data changes. Distribution, organization and storage of data on the cloud computing environment are managed utilizing available cloud storage resources. Communications from the client-server are monitored and client-server data is updated as it changes. The heartbeat of client-server is monitored and, if interruption is detected, the cause of heartbeat interruption is diagnosed and a decision is made whether failover is to be initiated.

If a determination is made that failover should be initiated, the diagnosis is sent to the user to request permission to create virtual machines to substitute for the failed client-server. The Master Monitor advises the cloud computing environment to get ready, and the cloud computing environment activates buffering computational resources and pulls client-server component information. Subsequently, needed buffering computational resources are partitioned from the cloud computing environment. Once the process has been initiated as described hereinabove, the virtual machines are ready to substitute for the failed client-server.

The user is in electronic communication with the cloud computing environment via messages from the Master Monitor. The user logs into account login, and a decision is made whether access is granted to the user. If access is not granted, the process ends. If access is granted, the user selects whether to initiate failover. If the user decides not to initiate failover, the virtual machines are not built and the process terminates. However, if the user selects initiation of failover, a subsequent determination is made whether the system has failed. If system has failed, the Master Monitor builds the virtual machines in read-write mode according to identified client-server components, the user activates the virtual machines in read-write mode and the virtual machines are accessed by the client-servers. If the system did not fail, the Master Monitor builds the virtual machines in read-only mode according to the identified client-server components, the user activates the virtual machines in read-only mode, and the virtual machines are accessed by the client-servers.

Subsequently, the virtual machines substitute for the failed client-server. The Master Monitor monitors cloud resource usage and load balancing. Next, a decision is made whether the client-server has now become operational, and, if so, a determination is made whether to end failover. If the client-server is not operational, the Master Monitor continues to monitor cloud resource usage and load balancing.

If failover is not to end, the virtual machines remain deployed and a decision is made whether to reinstall the Replication Monitor Agent. If the Replication Monitor Agent is to be reinstalled, such is carried out as described more fully hereinabove. If the Replication Monitor Agent is not to be reinstalled, the virtual machines are deactivated and client-server restoration is initiated.

Subsequently, the process continues on parallel paths: a) to management of distribution, organization and storage of data on the client-server utilizing available storage resources and b) to data replication to the client-server as described more fully hereinbelow.

Continuing along path b), a test is made whether the software application is stored on the failed client-server. If so, the software application is not replicated and the process continues to replication of application relevant data. If the software application is not stored on the failed client-server, the software application is replicated prior to replication of application relevant data. Finally, the process continues via parallel paths branching to c) distribution, organization and storage of data on cloud computing environment (described hereinabove) and to d) disassembly of virtual machines.

A comparison of the virtual machines installed on the cloud computing environment with the client-server, shows that both have identical operating system, software application, 'x' number of computers having 'y' processing and memory capacity and 'z' configuration, 'a' database having 'b' connection, relevant application components and application relevant data.

Accordingly, a feature and advantage of the present invention is its ability to allow virtual machines to be installed on the cloud computing environment to substitute for a plurality of failed client-server systems.

Another feature and advantage of the present invention is its ability to provide greater scalability by only utilizing resources as needed for backup, failover, and restoration processes.

Still another feature and advantage of the present invention is its ability to protection for sensitive personal information, such as medical information.

Yet another feature and advantage of the present invention is its ability to prevent loss of critical information.

Yet still another feature and advantage of the present invention is its ability to provide near-continuous operational service, even when a client-server fails.

A further feature and advantage of the present invention is its benefit of automation and scalability that significantly reduces the cost of ownership by allowing businesses to avoid paying more for additional hardware and unnecessary IT services.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATE EMBODIMENTS OF THE INVENTION

In describing the preferred and selected alternate embodiments of the present invention, as illustrated in FIGS. 1-10, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-10, a preferred embodiment comprises system 20 for providing total real-time redundancy for a plurality of client-servers, wherein system 20 comprises client-servers 100 and cloud computing environment 106, and wherein client-servers 100 comprise failed client-server 114, and wherein cloud computing environment 106 comprises machine readable storage medium 108, replicated client-server data 102 stored on machine readable storage medium 108, and substituted virtual machine 110 constructed from replicated client-server data 102.

System 20 further comprises secure network connection 104, wherein secure network connection 104 could comprise, for exemplary purposes only and without limitation, a local direct network connection or a secure Internet connection (such as, for exemplary purposes only, a virtual private network (VPN) operating independently within the Internet connection) that provides electronic communication between client-servers 100 and replicated client-server data 102, and wherein secure network connection 104 provides electronic communication between virtual machine 110 and failed client-server 114. It will be recognized by those skilled in the art that secure network connection 104 could comprise any type of network utilized both locally and/or between client-server 100 and cloud computing environment 106, and is not limited to a particular type of secure connection, being limited only by customer preferences, affordability, and/or availability.

Figure 1:
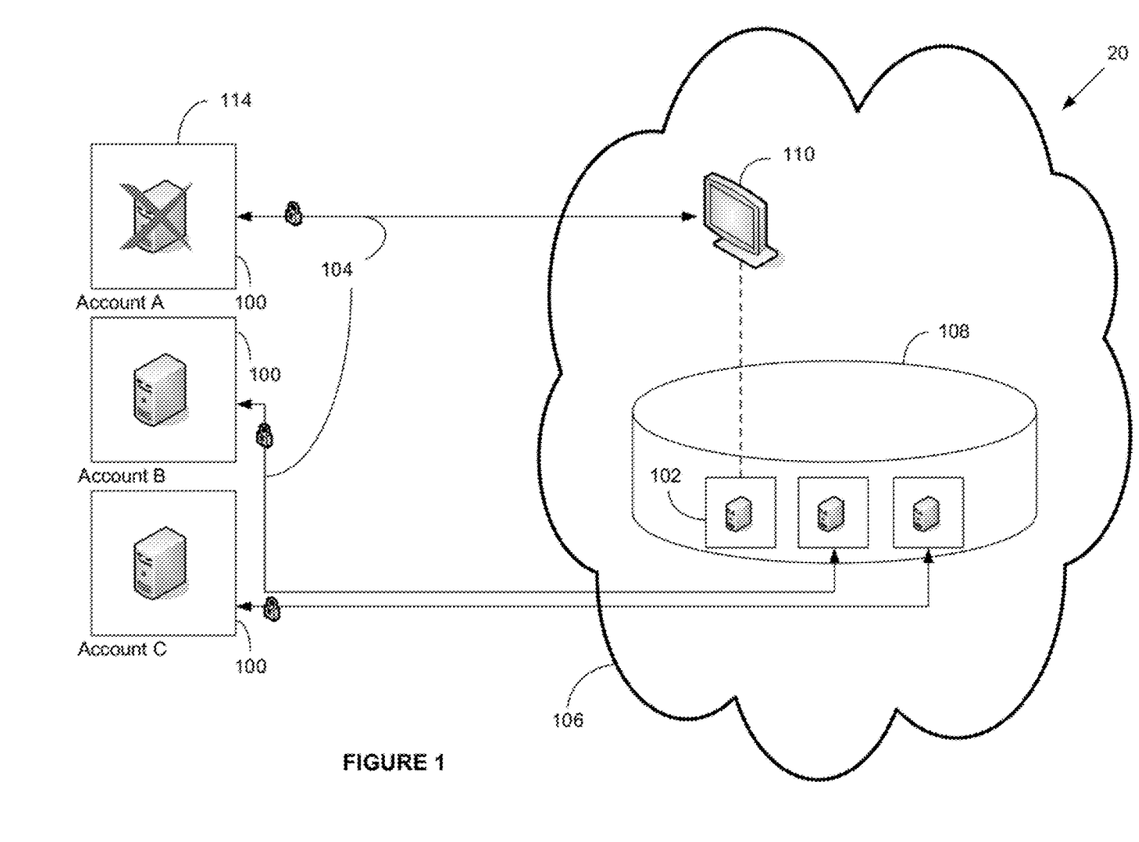
FIG. 1 is a schematic overview according to a preferred embodiment of a system for providing total real-time redundancy for a plurality of client-servers.
Figure 2:
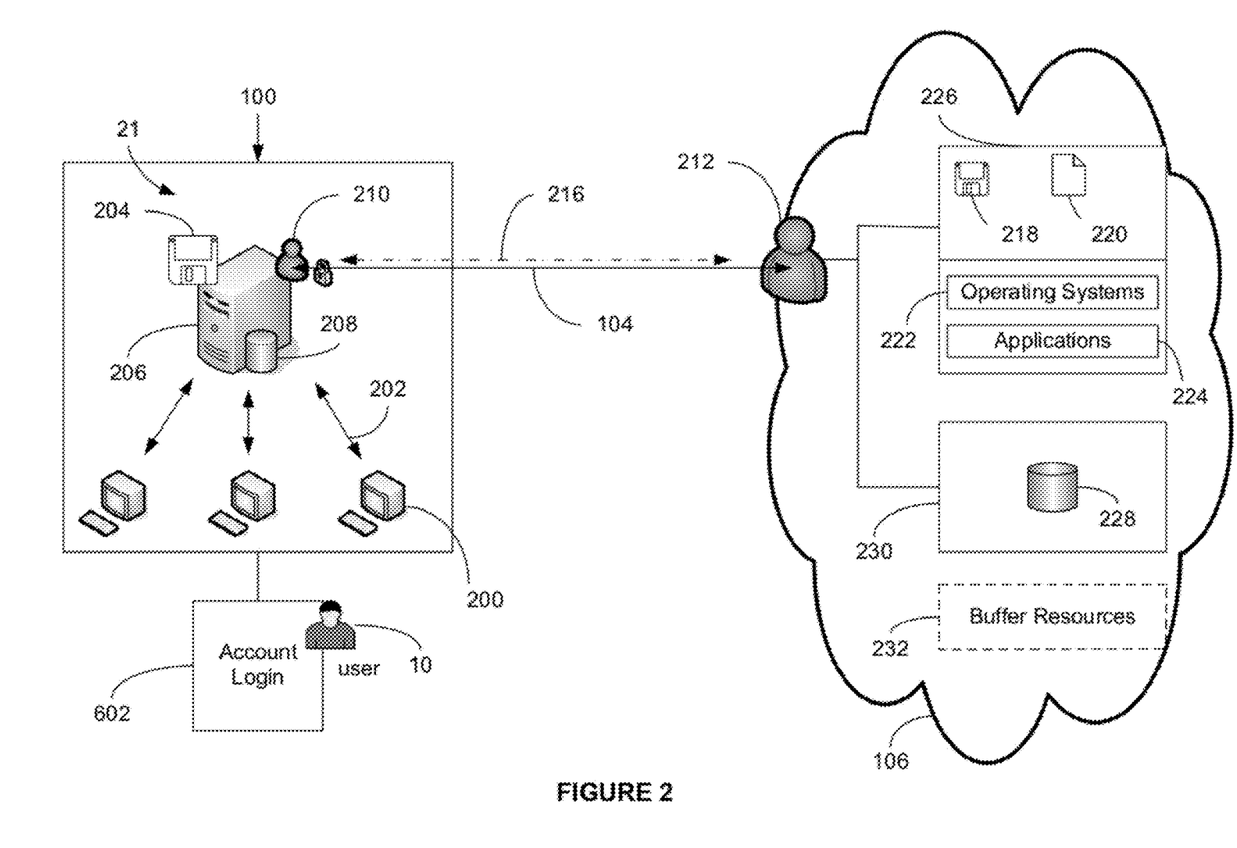
FIG. 2 is a detailed schematic view of a client-server and cloud computing environment according to the preferred embodiment of FIG. 1, before failure of the client server.

Turning now more particularly to FIG. 2, depicted therein are client-servers 100, wherein client-servers 100 comprise computers 200, local network connection 202, software application 204, database server 206, stored application relevant data 208 (such as, for exemplary purposes only, patient medical information) and Replication Monitor Agent 210, and wherein local network connection 202 provides electronic communication between computers 200 and database server 206, and wherein software application 204 and stored application relevant data 208 reside on database server 206.

It will be recognized by those skilled in the art that stored application relevant data 208 can be stored on any client-server storage medium 234 without departing from the spirit of the preferred embodiment, wherein stored application relevant data 208 is in communication with database server 206.

It will be recognized by those skilled in the art that computers 200 could comprise smart terminals in electronic communication via local network connection 202 with database server 206, as such are known in the art. It will be further recognized that computers 200 could comprise software application 204 operating thereon, in lieu of software application 204 operating on database server 206.

Continuing to refer to FIG. 2, cloud computing environment 106 comprises Master Monitor 212 installed thereon, and further comprises cloud storage resources 226, comprising, for exemplary purposes only, a machine readable storage medium 108, and cloud available memory 230, wherein cloud available memory 230 comprises replicated application data 228. Cloud storage resources 226 further comprise replicated software application 218 (in binary form), identified client-server component information 220 (in binary form), pre-stored operating systems 222 (in binary form), and pre-stored common relevant applications 224 (in binary form), wherein common relevant applications 224 comprise applications such as, for exemplary purposes only, ADOBE READER.

Master Monitor 212 communicates with Replication Monitor Agent 210 via secure network connection 104, wherein secure network connection 104 provides electronic communication between client-server 100 and cloud computing environment 106. It will be recognized by those skilled in the art that Master Monitor 212 and Replication Monitor Agent 210 could comprise components of the same application.

Heartbeat 216 is established between client-server 100 and cloud computing environment 106 via secure network connection 104, wherein heartbeat 216 comprises any signal that is identifiable to indicate that client-server 100 is functional.

Phase I—Setup

Turning now more particularly to FIGS. 2, 3-5 and 9, depicted therein are flowcharts and schematic views of system 20 and process 330, wherein process 330 details the steps for downloading and installing Replication Monitor Agent 210 to client-server 100, wherein via step 300, designated user 10 is identified and contact information is entered for designated user 10, and wherein contact information comprises, for exemplary purposes only and without limitation, email addresses and/or phone numbers. Subsequently, login credentials such as, for exemplary purposes only, a username and password combination, are created via step 301.

Figure 3:
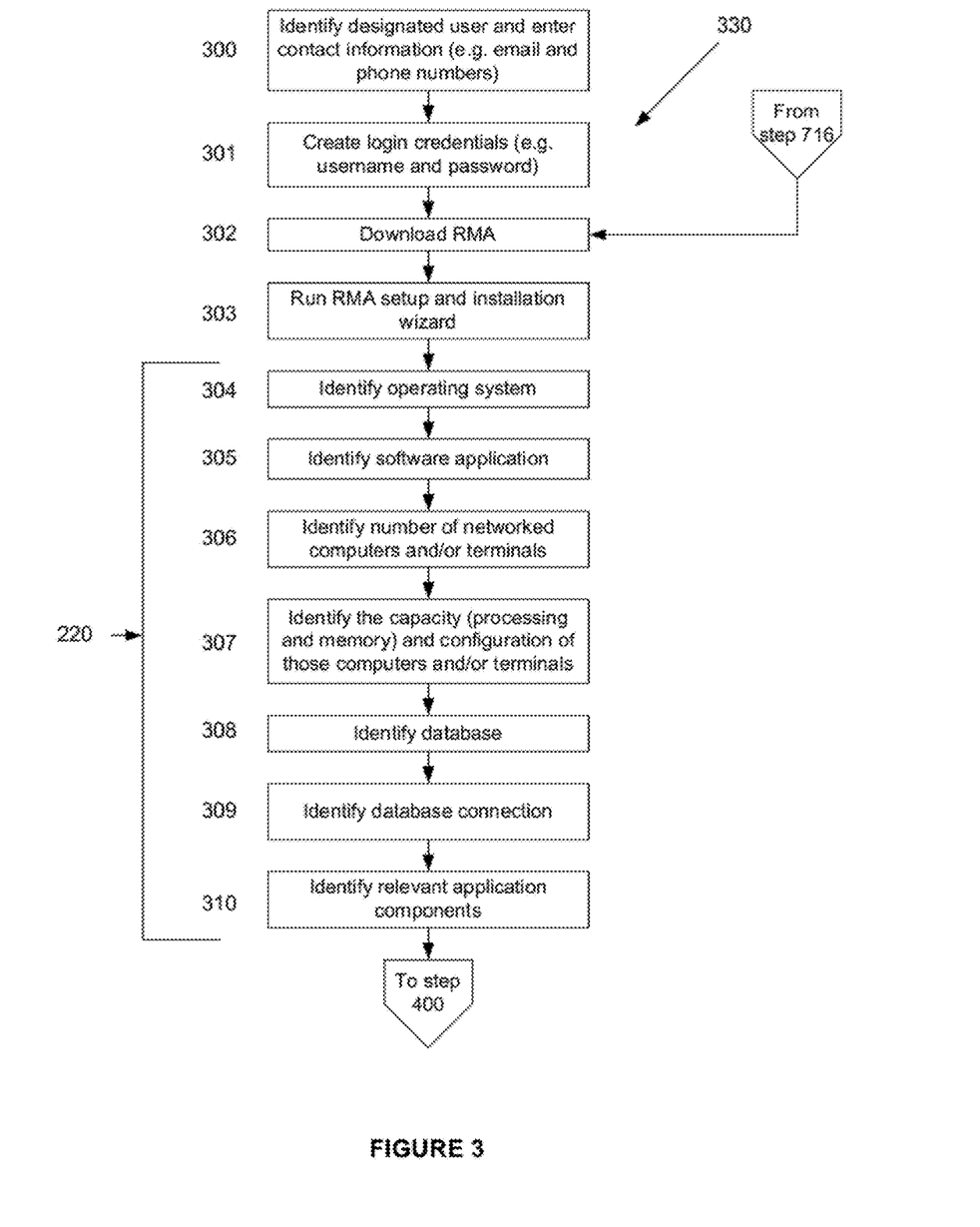
FIG. 3 is a flowchart showing the steps performed when downloading and installing a Replication Monitor Agent (RMA) to the client-server system according to the preferred embodiment.

Replication Monitor Agent 210 is next downloaded via step 302 to client-server 100, wherein Replication Monitor Agent 210 comprises a setup and installation wizard that is executed via step 303 after downloading. Identified client-server component information 220 is obtained via steps 304 through 310, wherein, in step 304, operating system 900 is identified and in step 305, software application 204 is identified. Subsequently, in step 306, networked computers 200 are identified, and, then, via step 307 capacity 18, such as, for exemplary purposes only, processing capacity and memory capacity, are identified, and configuration 22 of computers 200 is also identified.

In step 308, database 206 is identified and database connections 104, 202 are identified via step 309. Finally, relevant application components 908 are identified via step 310.

Figure 4:
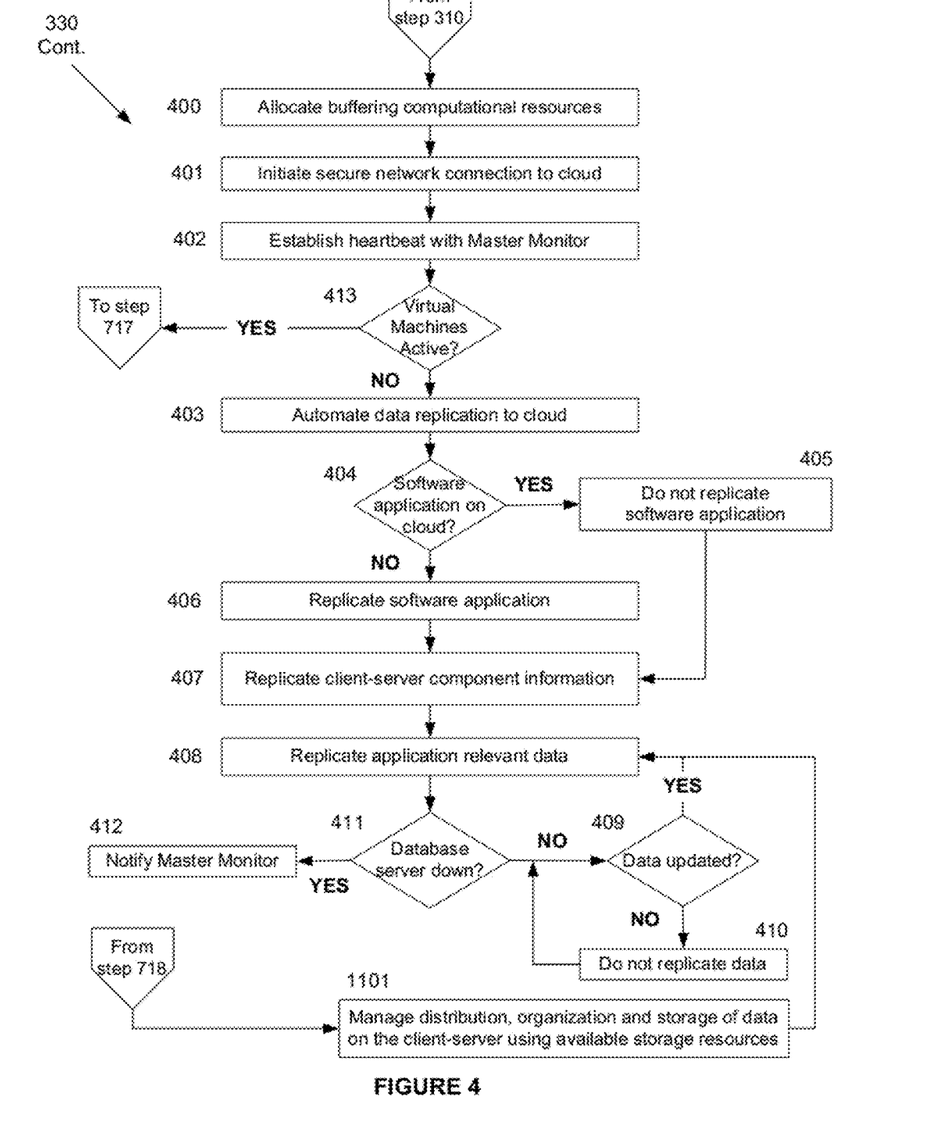
FIG. 4 is a flowchart showing the steps performed by the RMA installed on the system to establish communications with the cloud computing environment and to automate replication of data according to the preferred embodiment.
Figure 5:
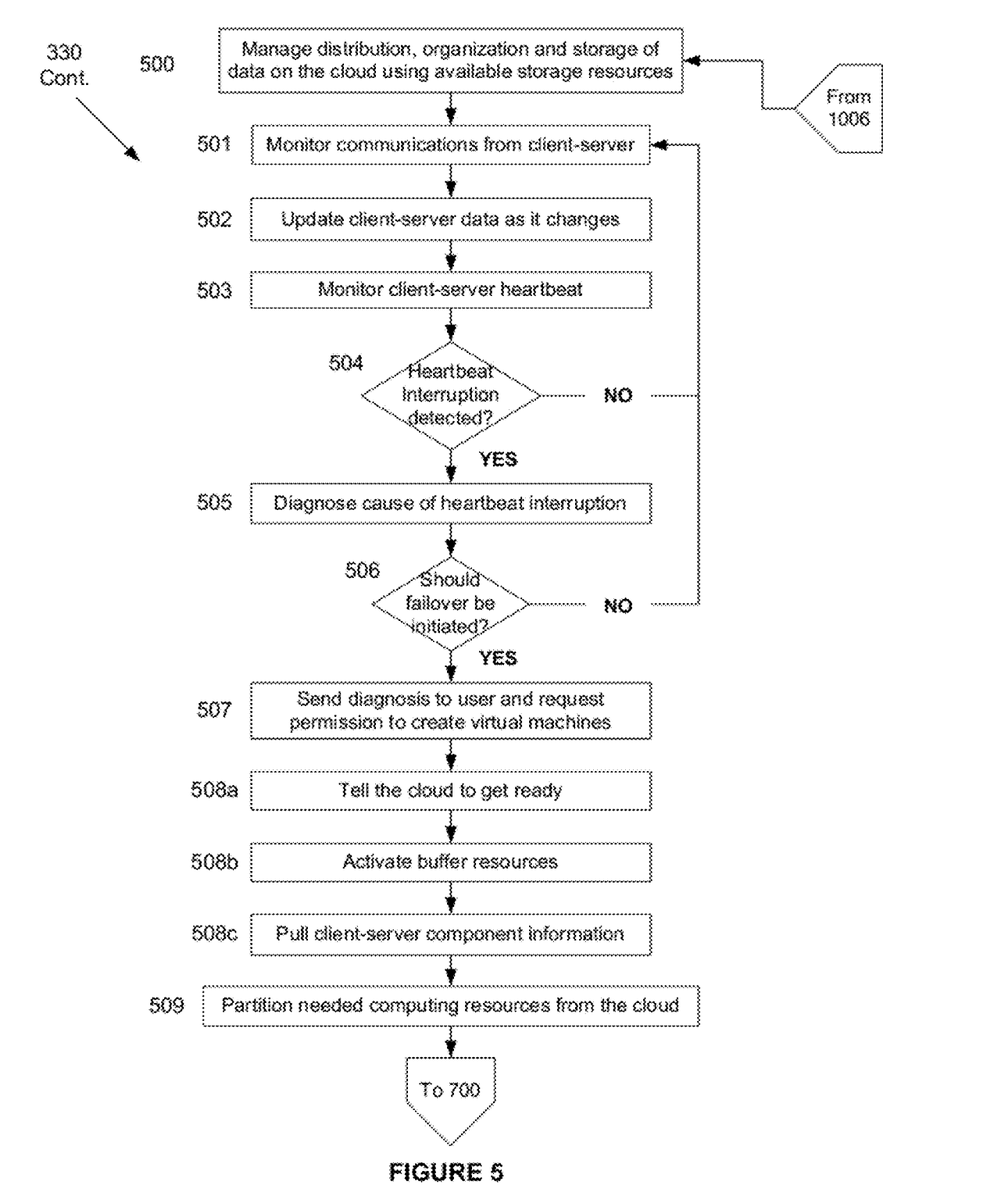
FIG. 5 is a flowchart showing the steps performed by a Master Monitor (MM) installed on the cloud computing environment to store and update data as it changes and to initiate failover according to the preferred embodiment.

Turning now more specifically to FIGS. 2, 4 and 5, depicted therein are steps detailing installation and operation of Replication Monitor Agent 210 on client-server 100 to allocate buffering computational resources 232 via step 400, establish communications via step 401 with cloud computing environment 106, establish heartbeat 216 with Master Monitor 212 via step 402. In step 413, activation of virtual machines 110 is detected, and if active, process 330 diverts to step 717 as described in detail hereinbelow. If virtual machines 110 are not active, data is replicated to cloud computing environment 106 via step 403. Subsequently, a decision is made via step 404 whether software application 204 is present on cloud computing environment 106 and, if so, replication of software application 204 does not take place and process 330 continues via step 407, wherein replication of client-server component information 220 takes place. If decision 404 detects that software application 204 is not present on cloud computing environment 106, software application 204 is replicated to cloud computing environment 106 via step 406 and process 330 continues with step 407 as described hereinabove.

Subsequently, via step 408, application relevant data 208 is replicated to cloud computing environment 106. Next, a decision is made in step 411 whether database server 206 is down and, if affirmative, Master Monitor 212 is notified via step 412. If decision 411 is negative, a determination is made in step 409 whether client-server data 102 has been updated. If in the affirmative, step 408 is again carried out. If in the negative, then step 410 does not replicate data.

Continuing now with FIG. 5, depicted therein is Master Monitor 212 storing and updating data as data changes, along with initiation of failover. In step 500, distribution, organization and storage of data on cloud computing environment 106 is managed utilizing available cloud storage resources 226. Subsequently, in step 501, communications from client-server are monitored and in step 502, client-server data 102 is updated as it changes. Heartbeat 216 of client-server 100 is monitored via step 503 and, if interruption is detected via step 504, step 505 will be executed to diagnose cause of heartbeat interruption and step 506 will subsequently decide whether failover is to be initiated. If no interruption is detected via step 504, Setup Phase I returns to step 501.

If step 506 indicates that failover should be initiated, step 507 is executed to send diagnosis to user 10 and to request permission to create virtual machines 110 to substitute for failed client-server 114, and Setup Phase I continues to step 508a. If decision 506 is negative, Setup Phase I returns to step 501.

In step 508a, Master Monitor 212 advises cloud computing environment 106 to get ready, wherein cloud computing environment 106 activates buffering computational resources 232 via step 508b, and pulls client-server component information 220 via step 508c. Subsequently, step 509 partitions needed active computing resources 604 from cloud computing environment 106. Process 330 continues to step 700.

Phase II—Post-Failure Implementation

Figure 6:
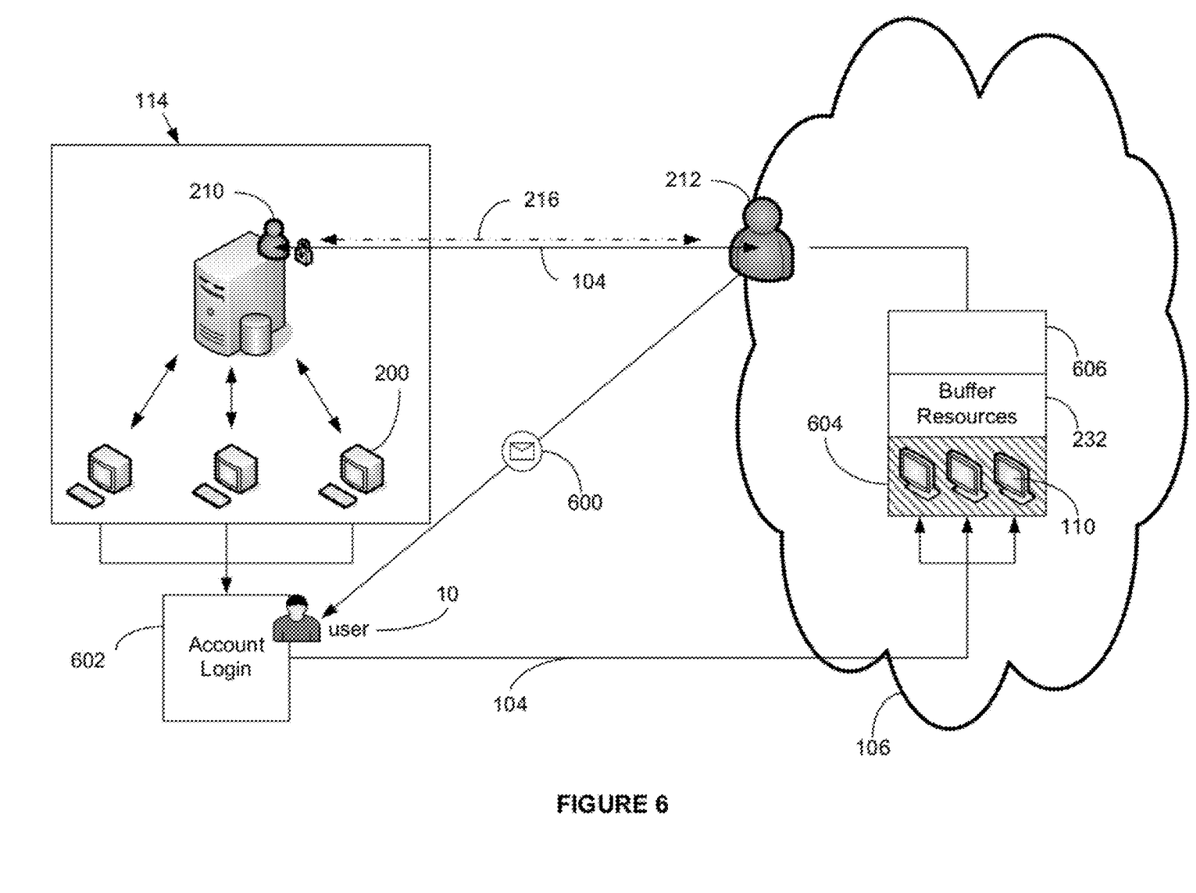
FIG. 6 is a detailed schematic view of a failed client-server, with virtual machines substituting for the client-server according to the preferred embodiment.

Turning now particularly to FIG. 6, once process 330 failover has been initiated via Setup Phase I hereinabove, virtual machines 110 are ready to substitute for failed client-server 114. Cloud computing environment 106 comprises Master Monitor 212, active computing resources 604 and inactive computing resources 606, and client-server 100 comprises computers 200 as described hereinabove, wherein client-server 100 is in electronic communication with active computing resources 604 via secure network connection 104, and wherein secure network connection 104 is accessed by user 10 via account login 602. User 10 is in electronic communication with cloud computing environment 106 via messages 600 from Master Monitor 212.

As described more fully hereinabove, client-server 114 and cloud computing environment 106 are in electronic communication via secure network connection 104, wherein heartbeat 216 is established on secure network connection 104.

Figure 7:
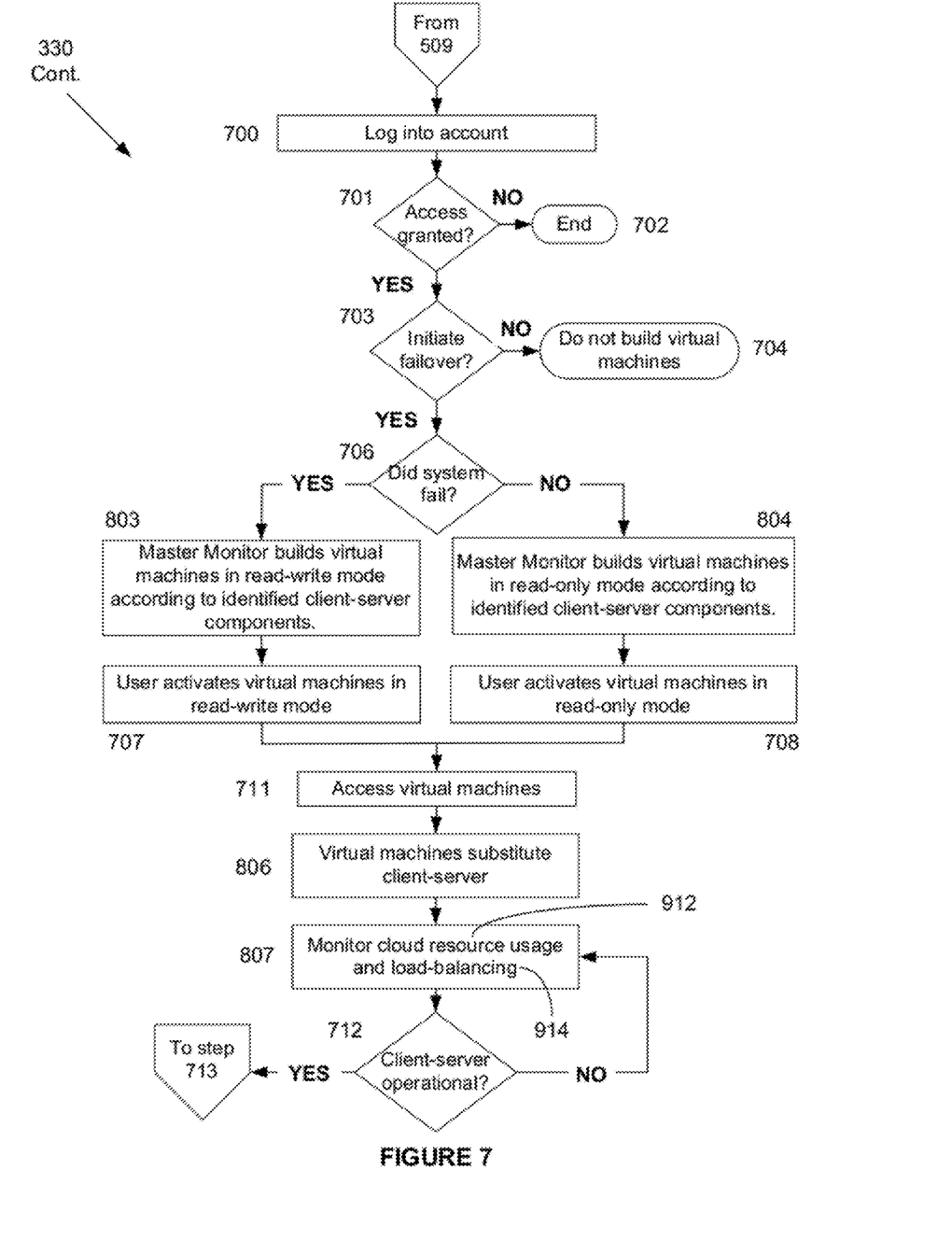
FIG. 7 illustrates a flowchart depicting the steps performed by a user to initiate and end failover and access virtual machines installed on the cloud computing environment, and by the MMA when building virtual machines on the cloud computing environment.
Figure 8:
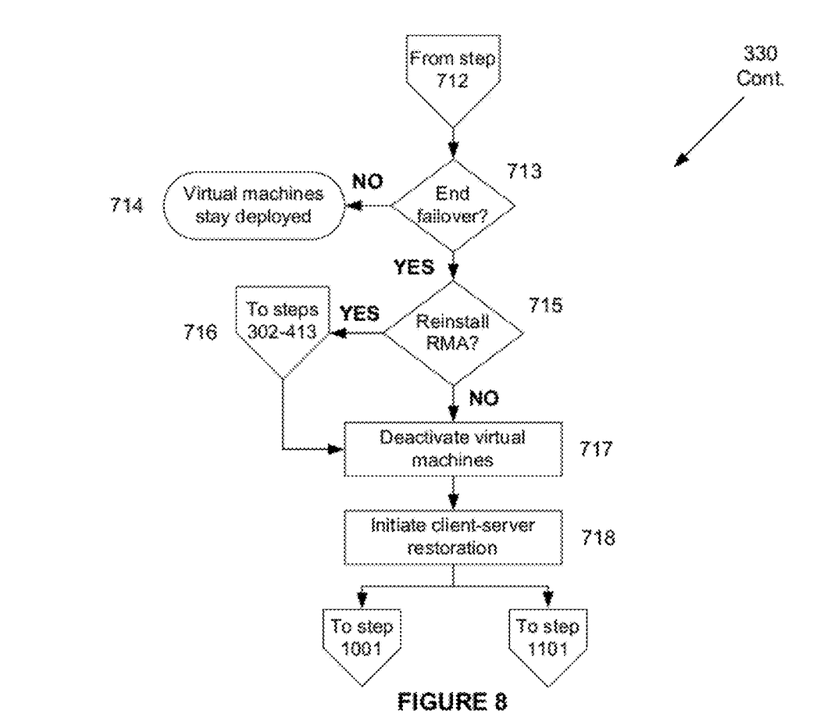
FIG. 8 illustrates a flowchart showing the steps performed to end failover and commence restoration of the client-server.

Turning now more particularly to FIGS. 7-8, depicted therein are Post-failure Implementation Phase II flowcharts of process 330 detailing the steps for initiating and ending failover, for access to virtual machines 110 installed on cloud computing environment 106, and for building virtual machines 110 on cloud computing environment 106.

User 10 logs into account login 602 via step 700, and process 330 decides whether access is granted via step 701, wherein if access is not granted, process 330 ends via step 702, and wherein if access is granted, user 10 selects whether to initiate failover via step 703. If step 703 is negative, virtual machines are not built and process terminates via step 704, but if user 10 selects initiation of failover via step 703, a subsequent determination is made via step 706 whether system 20 has failed. If system 20 has failed, Master Monitor 212 builds virtual machines 110 in read-write mode via step 803 according to identified client-server components 21, user 10 activates virtual machines 110 in read-write mode via step 707 and virtual machines 110 are accessed via step 711. If system 20 did not fail, Master Monitor 212 builds virtual machines 110 in read-only mode via step 804 according to identified client-server components 21, user 10 activates virtual machines 110 in read-only mode via step 708, and virtual machines 110 are accessed via step 711.

Subsequently, virtual machines 110 substitute for failed client-server 114 via step 806. Master Monitor 212 monitors cloud resource 912 usage and load balancing 914 via step 807. Next, a decision whether client-server 114 has now become operational is made via step 712, wherein if affirmative, process 330 branches to step 713 as described hereinbelow. If client-server 114 is not operational, process 330 returns to step 807, wherein Master Monitor 212 continues to monitor cloud resource usage 912 and load balancing 914.

Continuing now with FIG. 8, in step 713, a determination is made whether to end failover. If negative, virtual machines 110 remain deployed as in step 714. If affirmative, a decision is made via step 715 whether to reinstall Replication Monitor Agent 210. If affirmative, process 330 branches to steps 302-413 as described more fully hereinabove. If negative, virtual machines 110 are deactivated via step 717, client-server 114 restoration is initiated via step 718, and process 330 continues on parallel paths: a) to step 1101 (best shown in FIG. 4), wherein distribution, organization and storage of data on failed client-server 114 is managed utilizing client-server storage medium 234 and continuing to step 408, and b) to step 1001 (best shown in FIG. 10).

Phase III—Recovery and Termination

Figure 10:
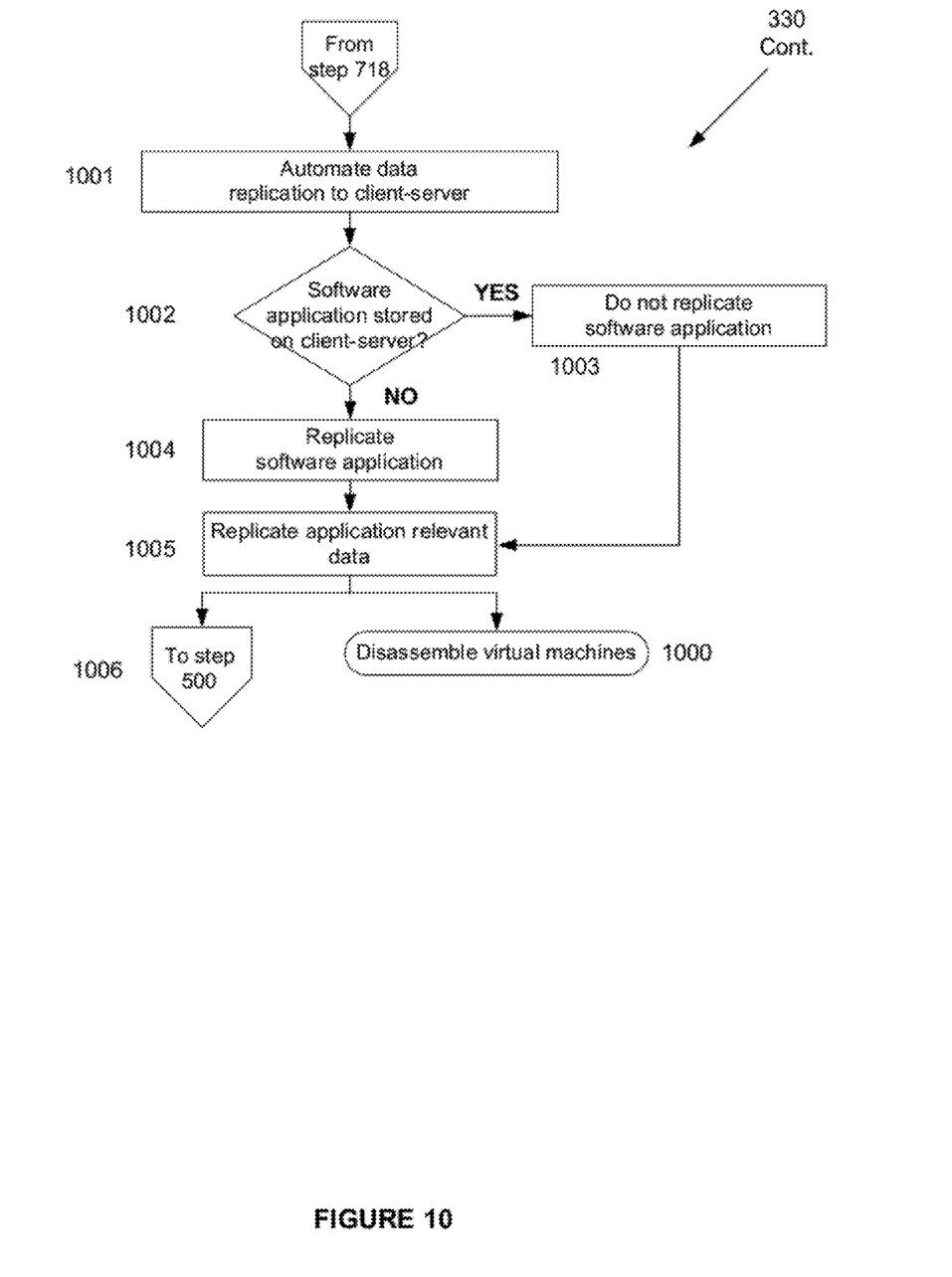
FIG. 10 is a flowchart showing the steps performed by the MMA to complete restoration of data to the client-server with subsequent disassembly of the virtual machines.

Turning now more particularly to FIG. 10, process 330 continues via step 1001, wherein data is replicated to client-server 114. Subsequently, via step 1002, a test is made whether software application 902 is stored on failed client-server 114 (now restored). If affirmative, software application 902 is not replicated via step 1003 and process 330 continues to step 1005. If negative, step 1004 replicates software application 902 and step 1005 subsequently replicates application relevant data 208. Finally, process 330 continues via parallel paths 1006 branching c) to step 500 (described hereinabove) and d) to step 1000, wherein virtual machines 110 are disassembled.

Figure 9:
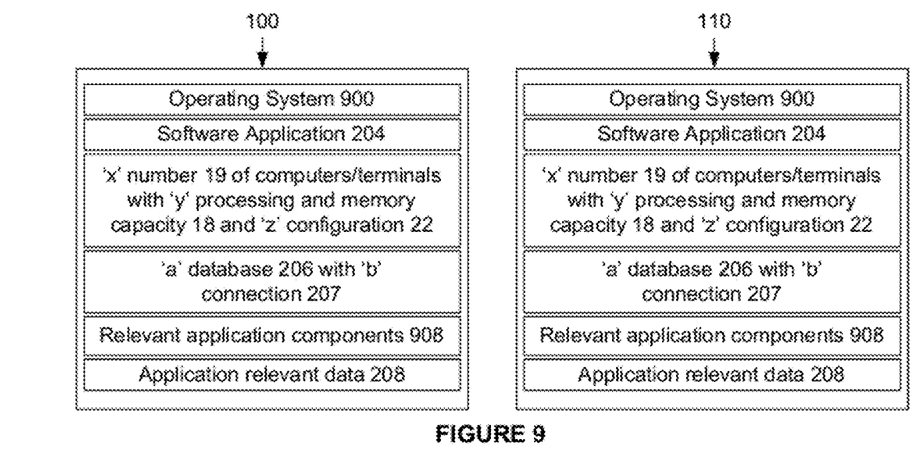
FIG. 9 is a chart depicting that the virtual machines installed on the cloud computing environment are identical to, and substitute for, the client-server.

Referring now to FIG. 9, depicted therein is a comparison showing that virtual machines 110 installed on cloud computing environment 106 are identical to client-server 100, wherein both client-server 100 and virtual machines 110 comprise identical operating system 900, software application 902, 'x' number 19 of computers 200 having 'y' processing and memory capacity 18 and 'z' configuration 22, 'a' database 906 having 'b' connection 207, relevant application components 908 and application relevant data 208.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. An automated and scalable method for providing total real-time redundancy for a plurality of client-servers, said method comprising the steps of:
   downloading and installing a Replication Monitor Agent on said client-servers and a Master Monitor on a cloud computing environment;
   replicating data existing on said client-servers and storing said replicated data in said cloud computing environment on at least one machine readable storage medium;
   creating virtual machines on said cloud computing environment;
   activating said virtual machines, wherein said virtual machines substitute for a failed client-server in the event a failure is detected;
   allowing users to login, access and use said virtual machines via a private network connection; and
   restoring said client-servers from said stored replicated data, and wherein said Master Monitor installed on said cloud computing environment performs the steps of:
   managing distribution, organization and storage of said replicated data on said cloud computing environment utilizing available storage resources;
   monitoring communications from said client-server;
   updating replicated data as client-server data changes;
   monitoring client-server heartbeats;
   diagnosing causes of heartbeat interruptions;
   initiating failover when either a database server is down or a client-server failure is detected, wherein said failover is initiated by sending a message to a designated user requesting permission to activate and install said virtual machines;
   obtaining client-server component information;
   partitioning needed computing resources from said cloud computing environment;
   activating said virtual machines, wherein said virtual machines substitute for a failed client-server;
   installing an operating system corresponding to said client-server's operating system, a software application and relevant data on said virtual machines;
   monitoring and managing cloud resource usage and load balancing;
   allowing users to login, access and utilize virtual machines via a private network connection; and
   restoring said client-server after failure by performing the steps of disassembling said virtual machines, and replicating said client-server data through said private network connection to said client-server.

2. The method of claim 1, wherein said Replication Monitoring Agent installed on said client-servers performs the steps of:
   identifying client-server components;
   initiating a secure public network connection to the cloud computing environment;
   establishing a heartbeat;
   replicating client-server data through the network connection to the cloud computing environment;
   communicating client-server component and data changes to said cloud computing environment;
   initiating failover when a database server failure is detected by notifying said Master Monitor installed on said cloud computing environment; and
   restoring said client-server after failure by performing the steps of identifying client-server components, initiating a secure public network connection to the cloud computing environment, establishing a heartbeat, and managing distribution, organization, installation and storage of said replicated data on said client-server.

3. The method of claim 1, said method further comprising the step of:
   pre-storing operating systems and other common relevant applications dormant in a binary form on said cloud computing environment utilizing said available storage resources.

4. The method of claim 1, said method further comprising the step of:
   allowing users to login, activate and access at least one of said virtual machines in a read-only mode via said private network connection.

* * * * *